Oct. 31, 1961     E. J. GESICK ET AL     3,006,649
ANIMAL IMMOBILIZER
Filed July 11, 1958     2 Sheets-Sheet 1
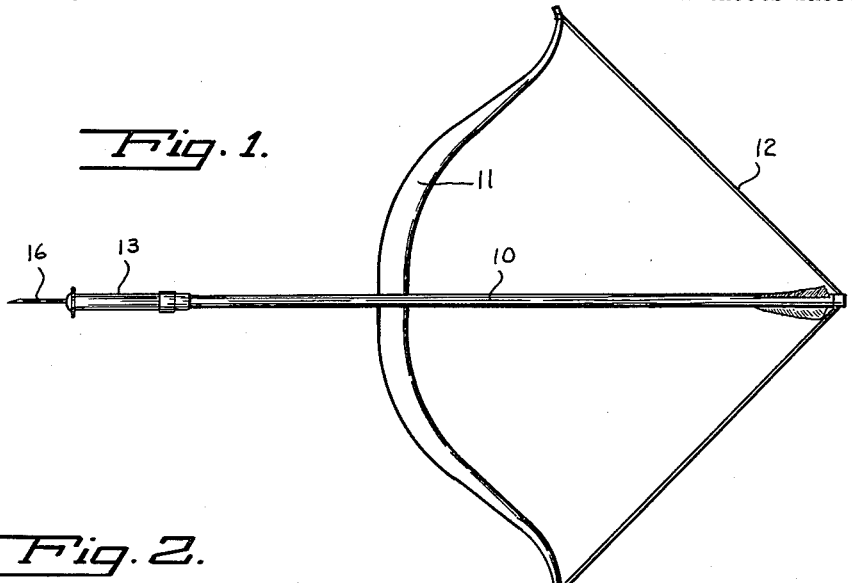
Fig. 1.
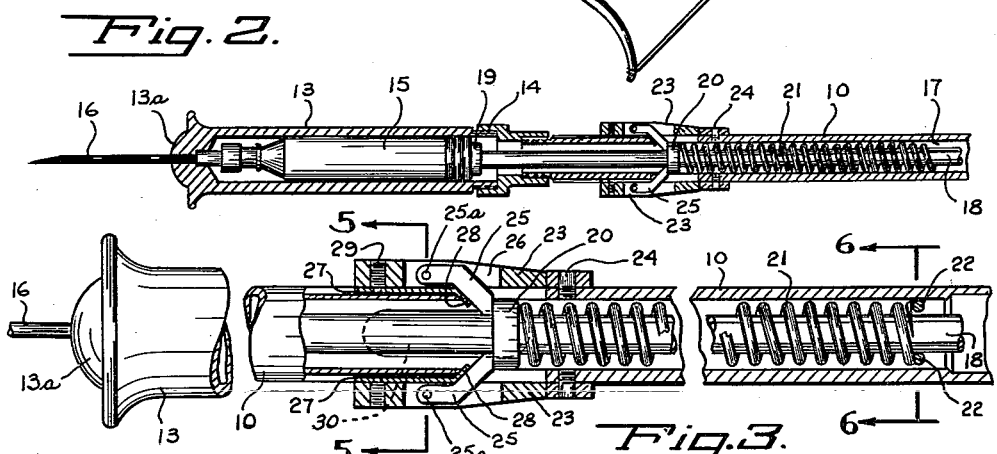
Fig. 2.
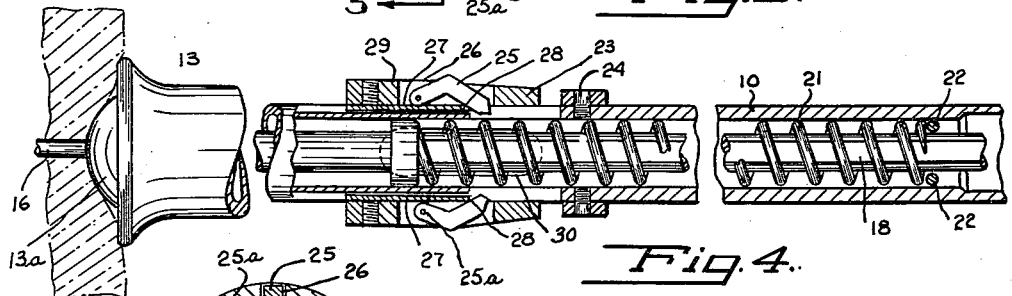
Fig. 3.
Fig. 4.
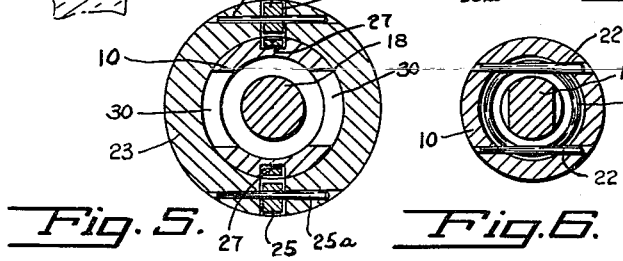
Fig. 5.     Fig. 6.
INVENTORS.
EDWARD J. GESICK
WILLIS MYNATT
JOHN McCOY
BY Raymond A. Paquin
ATTORNEY

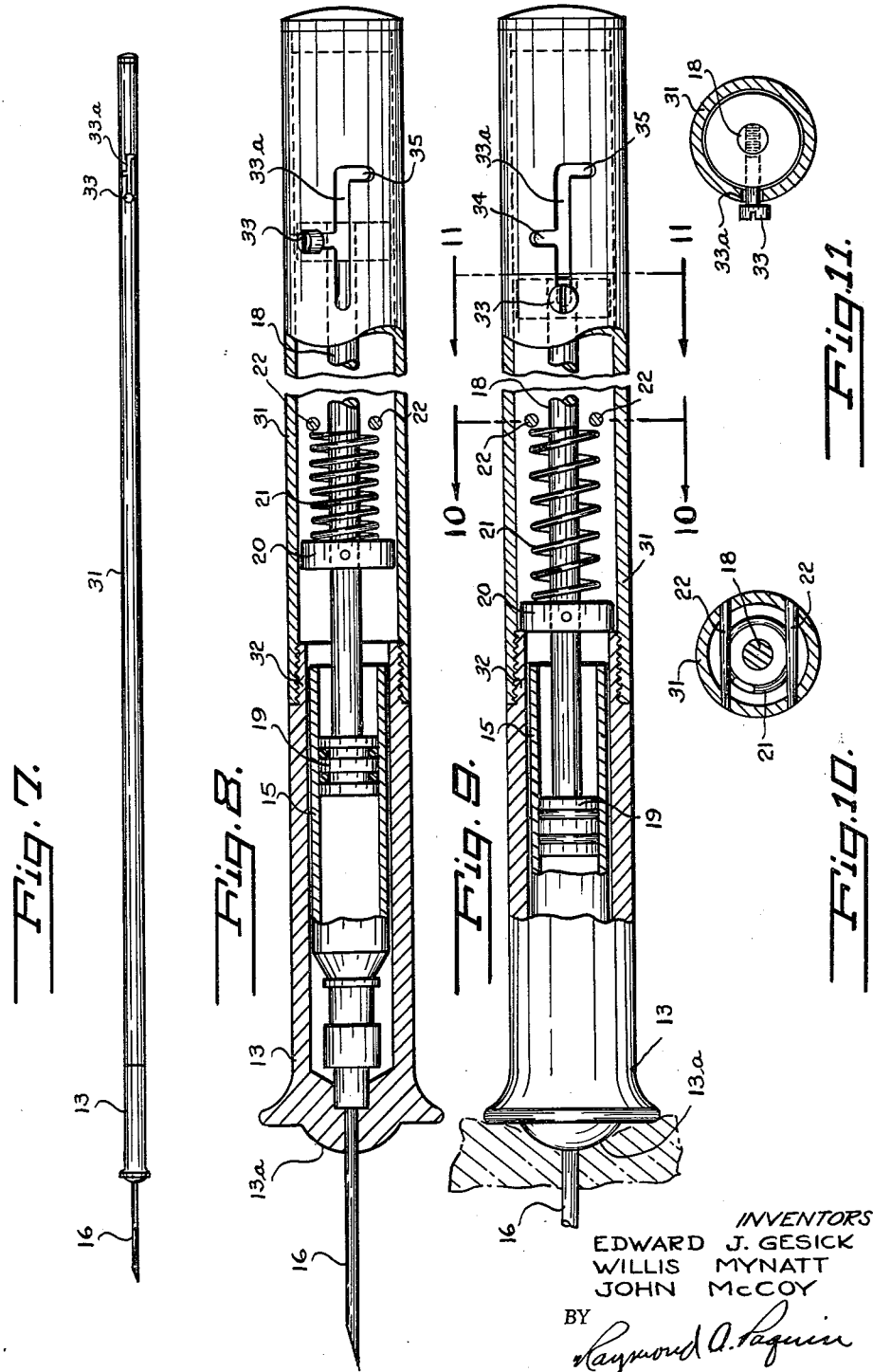

3,006,649
ANIMAL IMMOBILIZER
Edward J. Gesick, Terrill Hills, and Willis L. Mynatt and John W. McCoy, San Antonio, Tex., assignors to Southwest Research Institute, a corporation of Texas
Filed July 11, 1958, Ser. No. 747,930
3 Claims. (Cl. 273—106.5)

This invention relates to a new and improved apparatus for injecting or immobilizing animals and has particular reference to a new and improved apparatus of the type set forth which is particularly adapted for use with range animals, wild or domestic.

An object of the invention is to provide a device of the type set forth with which animals can be easily and quickly immobilized.

Another object is to provide a device of the type set forth with which animals can be temporarily immobilized without permanent injury.

Another object is to provide a new and improved apparatus whereby animals can be easily and quickly injected.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form has been given by way of illustration only.

Referring to the drawings:

FIG. 1 is a longitudinal side view showing an arrow form of missile together with a bow with which it may be used;

FIG. 2 is a fragmentary sectional view of the missile shown in FIG. 1;

FIG. 3 is a fragmentary enlarged view of the apparatus shown in FIG. 2, in position for use;

FIG. 4 is a view similar to FIG. 3, but showing the device after injection;

FIG. 5 is a sectional view taken on line 5—5 of FIG. 3, looking in the direction of the arrows;

FIG. 6 is a sectional view taken on line 6—6 of FIG. 3, looking in the direction of the arrows;

FIG. 7 is a side view of a spear form of apparatus embodying the invention;

FIG. 8 is a view similar to FIG. 7, but on an enlarged scale and partly in section;

FIG. 9 is a further view generally similar to FIG. 8, but further illustrating the use of the invention;

FIG. 10 is a sectional view taken on line 10—10 of FIG. 9, looking in the direction of the arrows; and FIG. 11 is a sectional view taken on line 11—11 of FIG. 9, looking in the direction of the arrows.

Referring more particularly to the drawings wherein similar reference characters designate corresponding parts throughout, in FIGS. 1 through 6 the invention is shown applied to an arrow 10 adapted to be propelled by a bow 11 with cord 12, although the invention could be applied to a spear as shown in FIGS. 7 through 11 or other form of missile adapted to be propelled through the air or jabbed into the animal by the user.

In the form shown in FIGS. 1 through 6 the missile or arrow 10 has the chamber member 13 connected to its forward end by a threaded connection 14 or other suitable means, whereby the member 13 may be removed and replaced as hereinafter described.

The member 13 is adapted to contain a capsule or the like 15 which may contain a narcotic drug, tranquilizer or other suitable substance, and to the capsule 15 is connected the hypodermic needle 16 which extends through an opening in the forward end of member 13 and extends forward of the member 13 as shown in FIGS. 1 and 2. The length of needle employed may be chosen according to the size of animal to be immobilized.

The portion of arrow or missile 10 adjacent member 13 is provided with the bore 17 in which is positioned the plunger rod 18, which has the shoulder or head 19 at its forward end for effecting injection from capsule 15, and plunger rod 18 also is provided with the peripheral flange 20 against which bears the forward end of compression coil spring 21. The stops 22 are provided for engagement by the opposite end of spring 21.

The device is provided with an inertia triggering mechanism which includes the member 23, which is slideably mounted on the body 10 and a stop which is secured to the body of the missile 10 by bolts or screws 24 and to the member 23 are pivotally mounted the trigger levers 25 on the pivots 25a, which are of the shape shown in FIG. 3 and are pivotally connected in slots 26 in the member 23 at diametrically opposed points.

Each of these members 25 has the deflected end which is deflected in such a direction that it is adapted to engage the forward face of flange member 20 to retain the spring in compressed position.

A flat spring 27 is provided for each of the trigger levers 25 and is secured inside of the member 23 adjacent its respective trigger lever 25 by a screw 29, with the adjacent ends 28 of each of said springs 27 adapted to force its respective triggering lever 25 out of engagement with flange 20 upon impact of the missile.

In operation the chamber member 13 is removed from the missile and loaded with a suitable narcotic drug and the hypodermic needle 16 chosen according to the animal on which the device is to be used. The rod 18 is forced inwardly to compress spring 17 and trigger levers 25 engage the forward end of flange 20 to retain the spring in compressed position.

The loaded capsule is placed within the chamber in chamber member 13 and chamber member 13 is then connected to the forward end of missile 10.

The arrow form of missile may then be shot in the usual manner by the bow 11 and cord 12 or, if the missile is of the spear type, it is jabbed into the animal or, if of the type shown in FIGS. 1 through 6, may be thrown or hurled at the animal, and upon impact of the missile with the animal the hypodermic needle 16 enters the flesh of the animal until the forward end 13a engages the hide of the animal, and such impact causes the inertia trigger mechanism 23 to move forward, opening fingers 25 and releasing spring 21 and loaded plunger 18 which forces the serum in capsule 15 through needle 16 into the animal.

In FIGS. 7 through 11 the invention is shown applied to a spear with which the animal is adapted to be jabbed as it passes. This form is particularly adapted for injecting the animal with a tranquilizing drug before shipment to prevent loss of weight due to excitement, although this form could be employed for injecting other forms of drugs or material for other purposes.

In this form the invention comprises a spear comprising a body or handle portion 31 to which the chamber member 13 is connected to portion 31 by the threaded connection 32 or other suitable means.

The cocking or triggering rod 18 is provided with the shoulder or head 19 at its forward end for effecting injection from capsule 15 and plunger rod 18, which is also a cocking and triggering rod, is also provided with spring seat member 20, for compression spring 21, which has its opposite end engaging stops 22.

Adjacent the end of rod 18 opposite head 19 is provided a member 33 adapted to slide in axial slot 33a and to be positioned within either of trigger stops or slots 34 or 35, depending upon the quantity to be injected, for example, the stop 34 could be used when the quantity to be injected is only 2.5 cc. whereas the trigger stop 35 would provide for an injection of 5 cc. Additional trigger stops could also be provided. The stops control the compression of spring 21 to thereby control the quantity injected.

In using this form of the invention the capsule 15 is loaded as described in connection with the forms of FIGS. 1 through 6, and the member 33 placed in the desired trigger stop which compresses spring 21. As the animal passes by the operator jabs the needle 16 into the flesh of the animal and then releases the compression spring 21 by turning member 33 from its position in one of the trigger stops and the spring forces plunger or head 19 into the capsule 15 to inject the drug or other material into the flesh of the animal. In FIG. 8 the apparatus is shown ready for injection, whereas in FIG. 9 it is shown after injection, at which time member 33 has been forced to the end of slot 33a by the movement of rod 18 which is effected by spring 21.

The charge of narcotic drug or other drug is selected, of course, according to the size of animal and type of animal on which the device is to be employed.

From the foregoing it will be seen that we have provided new and improved means for obtaining all of the objects and advantages of the invention.

We claim:

1. In a device of the character described, a missile having a chamber adjacent its forward end, a drug carrying capsule in said chamber, a hypodermic needle connected to the front end of said capsule and communicating with said capsule and extending forwardly of said missile, said capsule having a rear opening, and means for automatically effecting injection from said capsule through said hypodermic needle upon impact of said missile, said means comprising a plunger extending into said capsule through said rear opening within said missile and resilient means for actuating said plunger, and means for retaining said resilient means in compressed condition and for automatically releasing said resilient means upon impact of said missile, said last named means comprising means extending through the wall of said missile and operatively connected to said plunger and automatically releasable upon impact of said missile with an object.

2. In a device of the character described, a member having a handle portion having a chamber adjacent its forward end, a capsule in said chamber, a hypodermic needle connected to the front end of said capsule and communicating with said capsule and extending forwardly of said member, said capsule having a rear opening, a plunger extending into said capsule through said rear opening for effecting injection from said capsule through said hypodermic needle and means in said member for actuating said plunger, said means comprising resilient means operatively connected to said plunger and a stop member on said plunger and pivotable levers adapted to be pivoted into engagement with said stop member to lock said plunger in cocked position and automatically releasable upon impact of said missile with an object whereby said resilient means will propel said plunger in said capsule.

3. In a device of the character described, a member having a handle portion having a chamber adjacent its forward end, a capsule in said chamber, a hypodermic needle connected to the front end of said capsule and communicating with said capsule and extending forwardly of said member, said capsule having a rear opening, a plunger extending into said capsule through said rear opening for effecting injection from said capsule through said hypodermic needle and means in said member for actuating said plunger, said means comprising cocking and triggering means operatively connected to said plunger and spring means operatively connected to said plunger and automatically releasable upon impact of said missile with an object for actuating said plunger in said capsule upon release of said cocking and triggering means.

References Cited in the file of this patent

UNITED STATES PATENTS

| | | |
|---|---|---|
| 1,651,499 | Woodrow | Dec. 6, 1927 |
| 2,348,337 | Francis | May 9, 1944 |
| 2,620,190 | Bean | Dec. 2, 1952 |
| 2,792,834 | Kapelsohn | May 21, 1957 |
| 2,804,074 | Hill | Aug. 27, 1957 |